Jan. 1, 1952  W. DU BROFF  2,581,178
PHASE SEQUENCE AND VOLTAGE DIRECTION INDICATOR
Filed Nov. 22, 1949
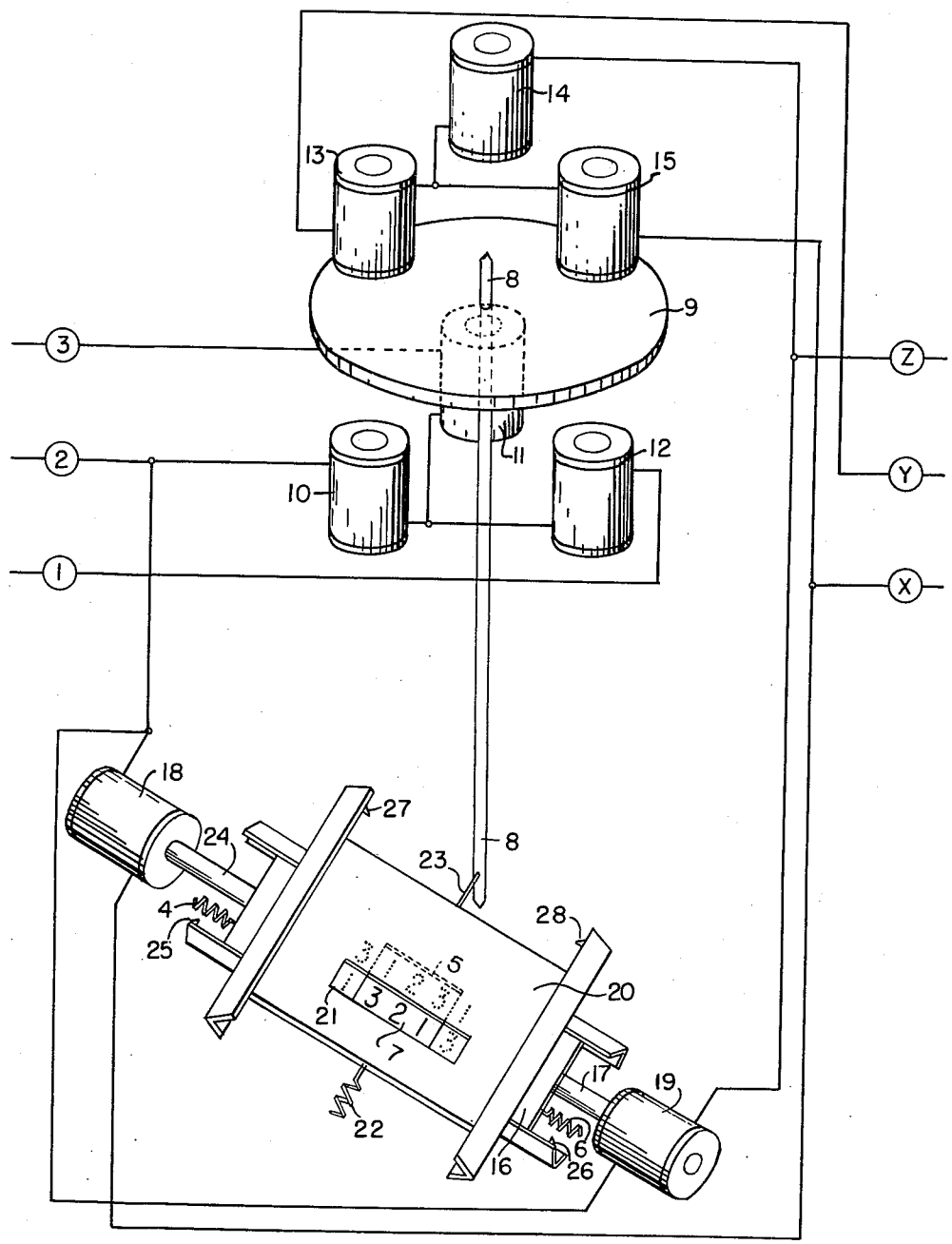
INVENTOR.
WARREN Du BROFF
BY
*Allard A. Braddock*
ATTORNEY Patented Jan. 1, 1952

2,581,178

UNITED STATES PATENT OFFICE 2,581,178

PHASE SEQUENCE AND VOLTAGE DIRECTION INDICATOR

Warren Du Broff, Chicago, Ill., assignor of one-half to William E. Weber, Chicago, Ill.

Application November 22, 1949, Serial No. 128,706

9 Claims. (Cl. 172—245)

1

This invention relates in general to electrical instruments and more particularly to an electrical instrument for positively identifying the phase sequence as well as the vector direction of each of the voltages in a three-phase electrical system.

Heretofore, in working with power circuits of a polyphase system, and particularly with three-phase systems, difficulty has been encountered in determining the vector directions of the individual voltages and the phase sequence of the wires or leads in order to properly parallel them into other circuits, machinery or electrical apparatus. In general, it has been a hit or miss proposition, working with a voltmeter and testing all the possible combinations namely three factorial, or in all, six possible combinations, of the voltages and phase sequences. Meanwhile numerous disconnections and new connections had to be made with necessity of cutting the power supply a like number of times as well as other obvious inconveniences. More recently, devices have been marketed which by means of lights indicate the phase sequence, but so far as the inventor knows, nowhere is there to be found an instrument which at a single indication can determine the phase sequence as well as the vector directions of the voltages.

Therefore, it is the chief object of this invention to provide an electrical instrument which at a single indication will positively determine the phase sequence and the vector directions of the voltages in a three-phase electrical system.

Another object of the invention is to provide an electrical instrument in keeping with the above object which will be accurate, dependable and of comparatively low cost to produce.

A feature of the invention lies in the simplicity of the indication arrived at by a single connection of the instrument into the circuit to be identified.

Another feature of the invention is that in the single connection stated above, all three lines of a three phase system may be instantly and positively identified or compared with corresponding lines of identical systems or of the same system.

A further feature resides in the employment of rotating field torques and solenoid action by voltage differentials in a coordinated manner to produce the single indication in keeping with the above mentioned objects and features.

These and other objects and features will be pointed out in the ensuing specification taken in conjunction with the accompanying drawing in which the figure is a perspective view of the instrument schematically showing the relationship of the various components one to another, as well as the operating circuits therefor.

Referring again to the drawing, numeral 8 represents a rotatable shaft. Midway on shaft 8 is a disk, 9, which is rigidly affixed thereto and which lies in a plane perpendicular to the axis of shaft 8. This disk may be made of thin aluminum sheet and is similar to the revolving disks found in well known watt hour meters. Beneath disk 9 are three coils, 10, 11, and 12, their cores positioned exactly 120° apart one from another and equidistant from shaft 8. In like manner, above disk 9 are three more coils, 13, 14, and 15, also 120 degrees apart one from the other and equidistant from shaft 8. Furthermore, the three coils of one set (13, 14, and 15) are positioned directly above the three coils of the other set (10, 11, and 12). As in watt hour meters, the coils are so placed with relation to disk 9 that when energized, rotating fields, or torques, are produced in the disk in well-known manner, which torques tend to rotate the disk in the cumulative direction of said torques. Of course, if the torques so produced are both clockwise, or both counterclockwise, the disk will rotate in such common direction; but if the torques produced are opposite one another, then their resultant is zero and their rotative tendencies cancel. The degree of rotation is therefore determined by the algebraic sum of the torques produced within the disk.

Two slides are provided, one above the other for giving the indication. The lower slide 16 is rigidly attached on one end to a plunger rod 17, and at the other end to a plunger rod 24, respectively within solenoids 19 and 18, which in turn are positioned on either side of this slide. Positioned beneath slide 16 on a plate 7 are two lines or rows of numerals in the following order:

3, 1, 2, 3, 1
1, 3, 2, 1, 3

These rows of numbers represent, respectively, a positive and a negative sequence. The solenoids 18 and 19 and their plunger rods 17 and 24 are arranged so that movement of the lower slide 16 is limited in either side direction to the space occupied by one number of said rows. Lower slide 16 has an opening 5 which exposes 6 numerals, there being any 3 adjacent numerals in one of the rows as well as the three adjacent numerals directly there above or below in the other row. Directly above the lower slide is an upper slide 20 which is moveable in a path transverse to that of the lower slide. Upper slide 20 has a small opening or window 21 permitting exposure of the five adjacent numbers in either line of numbers appearing under the lower slide 16. In normal position, the slides expose 3, 2, 1, which are the center three numbers in the bottom row. Upper slide 20 is held in this normal position by a coil spring 22. On the opposite edge of slide 20, from the coil spring 22, is attached a light cord, wire or cable 23, which in turn is attached to shaft 8. Upper slide 20 is limited in its movement to expose only the numbers of one or the other of the rows, and the movements of both slides are limited as described by stops properly placed on the slide runners.

Toward the left-hand side of the drawing appear three binding posts labeled 1, 2, and 3, to which the three wires of a given electrical system are connected. On the right-hand side of the drawing are three more binding posts to which the three wires of the electrical system to be identified or compared are connected. These latter wires being the unknowns are conveniently labeled X, Y, and Z. Of course it will be understood that any other suitable symbols may be used so long as the sequences are preserved, and the inventor does not wish to be limited merely to the preferred embodiment described hereinbefore.

Having described the mechanism, the operation and circuits therefor will now be detailed.

Assume for purposes of illustration that it is desired to parallel a three phase transformer circuit into another three phase power circuit, both representing common industrial equipment. In such a case, it is absolutely necessary that identical voltages be paralleled as well as assuring that the rotative direction or phase sequences of the two systems are matched. In the instant invention, the three wires of the existing or reference power system are connected to terminals 1, 2, and 3 with the object in view of determining which of the three wires of the transformer circuit correspond in phase to wire 1, wire 2, and wire 3 in the reference system. It will be understood, therefore, that it does not matter in which order the three wires are connected to binding posts 1, 2, and 3, because the comparison to be made is relative and it is only necessary in practice to match like voltages and have both phase sequences in the same rotative direction, positive or negative.

Referring again to the accompanying drawing and the internal wiring therein, it is seen that posts 1, 2, and 3 are wired to the set of three coils 10, 11, and 12 which are positioned 120 degrees apart and below disk 9. When the voltages of the reference system are applied, coils 10, 11, and 12 energize. The respective circuits therefor are traced from post 1, through windings of coils 12 and 10 to post 2; from post 2, through windings of coils 10 and 11 to post 3; and from post 1, through windings of coils 12 and 11 to post 3. The voltage drops across any two wires of the three phase reference system will cause the coils to energize. The physical and electrical arrangement of these three lower coils produces upon energization a rotating field or torque in disk 9 in well-known manner, tending to rotate disk 9 clockwise or counterclockwise depending upon whether the phase sequence of the reference system is positive or negative. The actual direction of rotation is not by itself here significant. However, when the three lines of the unknown circuit or the one that is desired to be paralleled are connected to posts X, Y, and Z, which are connected to coils 13, 14, and 15, the three upper coils become energized. The circuits for energizing these upper three coils are easily traced from the voltage drop across X and Y through windings of coils 13 and 15, from the voltage drop across Y and Z through windings of coils 13 and 14 and from the voltage drops across X and Z through windings of 14 and 15. Upon energization, coils 13, 14, and 15, also produce a torque in disk 9 tending to rotate it in a definite direction. Now, because of the arrangement of the two sets of coils, upper and lower, in case the phase sequence of 1, 2, and 3, is the same as that of X, Y, and Z, the two torques will be additive and tend to rotate the disk 9 in the same direction. However, if the phase sequence of 1, 2, and 3 is opposite to the sequence of X, Y, and Z, then the two induced torques oppose one another and disk 9 remains stationary. Because upper slide 20 is connected by cord 23 to the shaft 8, rotation of disk 9 causes cord 23 to be wound around the shaft and upper slide 20 is therefore movable either toward or away from shaft 8 by cord 23 and retractile spring 22, respectively. In case the torques oppose one another and disk 9 does not move, the lower line of numbers 1, 3, 2, 1, 3, under lower slide 16 is below the opening or window 21 in slide 20. It will be noted that these numbers representing the three lines of a system are vectorially in counterclockwise order or a negative sequence. On the other hand, if the torques are additive disk 9 rotates and shaft 8 winds cord 23 thereabout pulling slide 20 towards it until stopped by stops 27 and 28 positioning window 21 over the top line of numbers 3, 1, 2, 3, 1. This series of numbers it will be noted represents a clockwise order or positive sequence. The upper slide 20, therefore, exposes either a negative or a positive sequence of the lines connected to posts X, Y, and Z with reference to the lines connected to posts 1, 2, and 3.

Lower slide 16 is actuated by solenoids 18 and 19 which are located on either side thereof due to voltage differentials present across the leads thereto. One terminal of each solenoid, 18 and 19, is connected to post 2, while the other two terminals thereof are connected to posts X and Z respectively. When one of these solenoids is energized, slide 16 moves in the direction of the energized solenoid, and if both solenoids are energized, their forces cancel and slide 16 remains centrally disposed therebetween.

As previously stated, X, Y, and Z, can be any one of six possible combinations. The following table lists the six possible arrangements for X, Y, and Z, with reference to 1, 2, and 3, as well as the direction of movement of lower slide 16, if any, for each of these possibilities.

| Possible combinations of— | | | Direction of movement of slide 16, if any |
| --- | --- | --- | --- |
| X | Y | Z | |
| 1 | 2 | 3 | None |
| 3 | 1 | 2 | Left |
| 2 | 3 | 1 | Right |
| 1 | 3 | 2 | Left |
| 2 | 1 | 3 | Right |
| 3 | 2 | 1 | None |

Remembering that one lead of each solenoid 18 and 19 is connected to post 2 and that solenoid 19 is connected by its other lead to Z, whereas 18 by its other lead is connected to X, the circuits for energizing solenoids 18 and 19 are under any of the six possible combinations listed as follows. In case X corresponds to line 1, the voltage differential across solenoid 18 is that across line 1 and 2. Solenoid 18, therefore, energizes. In the same combination, assuming Z to correspond to line 3, solenoid 19 has across its leads the voltage differential between 2 and 3, and therefore solenoid 19 is also energized. In this combination it is seen then that both solenoids 18 and 19 are energized and their individual forces exerted on bars 17 and 24 cancel so that lower slide 16 and its opening 5 remains centrally disposed to cooperate with opening 21 to expose therethrough this sequence of numbers. Proceeding to the next combination in the table, if X corresponds to 3 and Z to 2, then there is across solenoid 18 the voltage differential between lines 3 and 2, while solenoid 19 has across its leads the voltage drop between lines 2 and 2, or zero. Solenoid 18 therefore energizes while 19 remains deenergized, causing slide 16 to be moved to the left as indicated in the movement column for this combination. Taking the next possible combination listed above, where X corresponds to 2 and Z to 1, solenoid 18 has across its leads the voltage differential between 2 and 2, or zero, and therefore remains deenergized. Solenoid 19, however, has across its leads the voltage differential between 2 and 1, causing it to energize thereby moving slide 16 and its opening 5 to the right.

In like manner continuing down the remainder of the list of combinations and into the reverse or negative sequences, where X corresponds to 1 and Z to 2, there is a voltage differential across solenoid 19, but none across 18, causing solenoid 18 to energize and move slide 16 to the left. Again, where X corresponds to 2 and Z to 3, solenoid 19 energizes but 18 does not and slide 16 with opening 5 moves to the right. In the last possible combination, where X corresponds to 3 and Z to 1, again both solenoids 18 and 19 energize and their resultant forces cancel so that the slide 16 remains centered.

In this manner, lower slide 16 responds to the voltage differentials set up across the leads of its controlling solenoids 18 and 19 causing it and its opening 5 to move either right, left, or to remain centered, in any case exposing through openings 5 and 21 a series of three numbers which positively identify the phase of each of the three lines of the unknown system with relation to those of another system. As the coils and solenoids energize together the movements of the slides are simultaneous and the final positions of the openings 5 and 21 therein expose the combination which X, Y, and Z corresponds to, all in a single positive indication. It is now merely a simple mechanical operation to tie line 1 to line 1, 2 to 2, and 3 to 3.

It is to be understood that while I have described and illustrated in the accompanying drawing a preferred embodiment of my invention, the same is susceptible of modification and change without departing from the spirit thereof.

Having described my invention in detail, what I claim and desire to have protected by issuance of Letters Patent of the United States is:

1. In an electrical phase sequence and voltage direction indicater adapted for use with two three-phase electrical circuits, sets of coils positioned to produce rotating fields, each set being associated with one of said circuits and connected thereto to be energized by it, means responsive to the energization of said sets of coils for comparing the direction of rotation of the fields to thereby determine whether the phase sequences of the two circuits are opposite or alike, and solenoid means connected to said circuits for simultaneously comparing the directions of the individual voltages of one of said circuits with reference to the other of said circuits.

2. In an electrical phase sequence and voltage direction indicator, a rotatable element, two sets of coils, each set comprising a plurality of coils positioned in spaced relation one to another and to said rotatable element, a given three-phase electrical circuit for energizing one of said sets of coils and a second three-phase electrical circuit for energizing the other set of coils, said sets so positioned to produce torques in said rotatable element when energized and said torques so produced tending to rotate said element in the directions of the torques, indicator means controlled by the resultant of said torques for indicating the phase sequence of said second circuit with reference to said given circuit, and other means simultaneously cooperating with said indicator means for indicating the directions of the individual voltages of said second circuit with reference to those of said given circuit.

3. In an electrical phase sequence and voltage direction indicator as claimed in claim 2, said second three-phase electrical circuit comprising a segment of said given three-phase circuit.

4. In an electrical phase sequence and voltage direction indicator, a rotatable disk, a set of coils positioned above said disk and a like set of coils positioned similarly below said disk, a three-phase electrical circuit for energizing one of said sets of coils and whose electrical conditions serve as a reference, a second three-phase electrical circuit for energizing the other set of said coils and whose electrical conditions are unknown, said sets of coils positioned so as to each produce a torque in said disk when energized tending to rotate it, and means including a movable slide cooperating with said rotatable disk for giving a single indication positively identifying the electrical conditions of said second circuit with the electrical conditions of said first circuit as a reference.

5. In an electrical phase sequence and voltage direction indicator, a rotatable disk, two sets of coils, the coils of each set in substantially 120 degree spaced relation one from the other, one set positioned above and one set below said disk and producing torques when energized tending to rotate said disk, a given three-phase circuit energizing one of said sets of coils and producing one torque in said disk, and a second three-phase circuit energizing the other set of said coils and producing another torque in said disk, said torques tending to rotate said disk in their corresponding directions, a two slide indicator, one slide of said indicator controlled by said torques, said one slide occupying one position when said torques oppose and cancel each other and occupying another position when said torques support one another, and solenoid means for positioning the other slide of said indicator simultaneously to positions corresponding to the direction of the individual voltages of said second three-phase circuit with reference to said given circuit.

6. In an electrical phase sequence and voltage direction indicator, a rotatable metallic disk, a first set of coils below said disk and a second set of coils above said disk, a given three-phase electrical circuit connected to said first set of coils and energizing them, a second three-phase electrical circuit connected to said second set of coils and energizing them, said first and second sets of coils positioned so that when energized each produces a torque tending to rotate said disk in the direction of said torque, indicator means controlled by the algebraic sum of said torques for indicating the phase sequence of said second three-phase circuit with reference to said given circuit, and other means cooperating with said first mentioned means for simultaneously indicating the directions of the individual voltages of said second three-phase circuit with reference to said first circuit.

7. In an electrical phase sequence and voltage direction indicator as claimed in claim 6, said disk having a shaft rigidly affixed thereto upon which to rotate, said indicator means comprising two slides one above the other and movable in transverse directions, means connecting one of said slides with said shaft so that when the resultant torque produced by said coils rotates said disk said connecting means is wound around said shaft drawing said connected slide towards said shaft, and said other means comprising solenoids placed on either side of the other of said slides, plungers for said solenoids and said other slide rigidly connected thereto so that when either of said solenoids is energized, said other slide moves toward that solenoid, and in case both solenoids are energized, said other slide remains centrally therebetween.

8. In an electrical phase sequence and voltage direction indicator as claimed in claim 7, two rows of symbols corresponding to the possible conditions of said second circuit positioned beneath said other slide, the row closest to said shaft representing a positive sequence, the other row representing a negative sequence, each row comprising five symbols so arranged that no three consecutive symbols in either row form a like sequence, said connected slide having an opening therein for exposing either of said rows of symbols, and spring means normally holding said connected slide and opening therein over the other of said rows, so that when the torques produced in said disk are in the same direction, said connected slide is moved to expose a positive sequence of symbols and when the torques oppose so that there is no resultant torque said spring means holds said opening over the row of symbols representing a negative sequence, an opening in said other slide, so that when either of said solenoids is energized said other slide and its opening is moved beneath said opening in said connected slide exposing through said openings the symbols representing the directions of the voltages of said second circuit with reference to said given circuit, and in case both solenoids are energized said opening in said other slide remains centrally therebetween exposing therethrough symbols representing the directions of the voltages of said second circuit with reference to said given circuit.

9. In an electrical phase sequence and voltage direction indicator as claimed in claim 8, said rows of symbols comprising the numbers 3, 1, 2, 3, 1, in said row nearest said shaft, and the numbers 1, 3, 2, 1, 3, in said other row.

WARREN DU BROFF.

REFERENCES CITED

The following references are of record in the file of this patent:

UNITED STATES PATENTS

| Number | Name | Date |
|---|---|---|
| 1,588,538 | Fortesque | June 15, 1926 |
| 1,659,606 | May | Feb. 21, 1928 |
| 1,680,754 | Traver | Aug. 14, 1928 |
| 1,703,345 | Knopp | Feb. 26, 1929 |
| 1,861,166 | Sieber | May 31, 1932 |
| 2,503,598 | Simkins | Apr. 11, 1950 |